(12) United States Patent
Schwendenmann

(10) Patent No.: US 10,731,558 B2
(45) Date of Patent: Aug. 4, 2020

(54) CIRCUMFERENTIAL LUBRICANT SCOOP

(71) Applicant: Rolls-Royce Corporation, Indianapolis, IN (US)

(72) Inventor: Andrew Schwendenmann, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1159 days.

(21) Appl. No.: 15/044,366

(22) Filed: Feb. 16, 2016

(65) Prior Publication Data

US 2017/0234222 A1    Aug. 17, 2017

(51) Int. Cl.

| | |
|---|---|
| F02C 7/06 | (2006.01) |
| F01D 25/18 | (2006.01) |
| F16C 19/06 | (2006.01) |
| F16C 33/66 | (2006.01) |
| F16C 35/073 | (2006.01) |
| F16C 33/58 | (2006.01) |
| F16C 33/60 | (2006.01) |

(52) U.S. Cl.
CPC ............. F02C 7/06 (2013.01); F01D 25/18 (2013.01); F16C 19/06 (2013.01); F16C 33/6677 (2013.01); F16C 35/073 (2013.01); F05D 2220/32 (2013.01); F05D 2260/98 (2013.01); F16C 33/583 (2013.01); F16C 33/60 (2013.01); F16C 33/6681 (2013.01); F16C 2360/23 (2013.01)

(58) Field of Classification Search
CPC .... F02C 7/06; F05D 2220/32; F05D 2260/98; F01D 25/18; F04D 1/12
See application file for complete search history.

(56) References Cited

U.S. PATENT DOCUMENTS

| | | | |
|---|---|---|---|
| 3,915,521 A | | 10/1975 | Young |
| 4,648,485 A | * | 3/1987 | Kovaleski ............... F01D 25/18 |
| | | | 184/13.1 |
| 6,409,464 B1 | * | 6/2002 | Fisher ..................... F01D 25/16 |
| | | | 384/475 |

(Continued)

FOREIGN PATENT DOCUMENTS

| | | |
|---|---|---|
| DE | 1299941 B | 7/1969 |
| EP | 2657463 B1 | 6/2015 |

OTHER PUBLICATIONS

European Patent Office, Extended European Search Report for corresponding EP Application No. 17156098.0 dated Aug. 9, 2017, 9 pgs.

(Continued)

*Primary Examiner* — Michael R Mansen
*Assistant Examiner* — Mark K Buse
(74) *Attorney, Agent, or Firm* — Shumaker & Sieffert, P.A.

(57) ABSTRACT

A circumferential lubricant scoop for providing lubricant to a bearing assembly. The scoop is disposed circumferentially about and rotates with a rotor shaft. The scoop comprises a plurality of lubricant capturing vanes shaped to capture and retain lubricant in a cavity behind a lower lip of the vane. This cavity is in fluid communication with channels leading to fluid pathways of an inner race of the bearing assembly. Fluid is moved through the channels and fluid pathways due to the rotational force imparted by the rotating rotor shaft.

15 Claims, 9 Drawing Sheets

(56) References Cited

U.S. PATENT DOCUMENTS

| | | | | |
|---|---|---|---|---|
| 6,682,222 B2* | 1/2004 | Fisher | ............... | F01D 25/18 |
| | | | | 384/462 |
| 6,976,827 B2 | 12/2005 | Bruno et al. | | |
| 7,931,407 B2 | 4/2011 | Begin et al. | | |
| 8,464,835 B2* | 6/2013 | Munson | ............ | F01D 25/16 |
| | | | | 184/14 |
| 8,985,277 B2 | 3/2015 | Hetherington et al. | | |
| 9,512,816 B2* | 12/2016 | Ferguson | ............ | F03B 7/003 |
| 2003/0039421 A1* | 2/2003 | Fisher | ............... | F01D 25/18 |
| | | | | 384/462 |
| 2006/0062504 A1 | 3/2006 | Wilton et al. | | |
| 2006/0263202 A1* | 11/2006 | Dins | ................. | F01D 25/20 |
| | | | | 415/88 |
| 2010/0038173 A1* | 2/2010 | Munson | ............ | F01D 25/16 |
| | | | | 184/6.11 |
| 2013/0283758 A1* | 10/2013 | Wotzak | ............ | F01D 25/18 |
| | | | | 60/39.08 |
| 2015/0219152 A1 | 8/2015 | Ward | | |
| 2016/0069186 A1* | 3/2016 | McDonagh | ......... | F01D 5/085 |
| | | | | 416/95 |

OTHER PUBLICATIONS

Response to the Extended European Search Report from counterpart EP application No. 17156098.0, dated Aug. 9, 2017, filed Mar. 6, 2018, 50 pgs.

* cited by examiner

US 10,731,558 B2

1

CIRCUMFERENTIAL LUBRICANT SCOOP

FIELD OF THE DISCLOSURE

The present disclosure relates generally to turbine engines, and more specifically to a lubricant scoop circumferentially disposed about a shaft of a turbine engine.

BACKGROUND

Turbine engines provide energy for a wide range of uses. A typical turbine engine comprises a compressor, a combustor, a high-pressure turbine, and a low-pressure turbine. Compressor and turbine blades are typically coupled to rotor discs, and these rotor discs are coupled to at least one rotor shaft. During operation of the turbine engine a rotor shaft rotates at high rates of speed and is supported by various bearings disposed along the length of the rotor shaft. These bearing generally require lubrication, which can be difficult to supply given the space constraints encountered in a turbine engine. Lubrication pathways must be provided which will adequately lubricate rotor shaft bearings and bearing components but which accommodate other components in the crowded turbine engine environment. One area of particular concern due to the difficulty of providing sufficient lubrication is the inner race, which supports the bearing and is disposed radially inward from the bearing.

To meet this need for lubrication pathways, previous efforts in the field have developed lubrication scoops which are disposed circumferentially about a rotor shaft. These scoops rotate with the rotor shaft and collect lubricant during rotation from either a lubricant reservoir or a lubricant jet which is sprayed in the direction or in the vicinity of the scoop. A plurality of vanes are used to collect lubricant, and fluid pathways are provided to supply the lubricant to various bearings and bearing components. Lubricant is moved through the fluid pathways by the rotational force of the rotor shaft; as the lubrication scoop rotates with the rotor shaft, lubricant is pushed through the fluid pathways and provided to the bearing.

Existing lubricant scoops in the art require the vanes and fluid pathways to be distanced sufficiently from the centerline of the rotor shaft such that sufficient circumferential scoop length and radial height is available to capture and retain incoming lubricant without impingement. These scoops therefore require relatively large diameter rotor shafts to be effective. Alternatively, these scoops must be designed with relatively large head height (i.e. the distance between the lubricant scoop body and the radially inner surface of a vane of the lubricant scoop). Since the space requirements of a turbine engine are typically highly constrained, there is thus a need in the art for lubricant scoops which can effectively provide lubricant to bearings and bearing components while also requiring less volume of turbine engine space, for example by functioning when attached to a smaller-diameter shaft or with a smaller head height than previous designs.

BRIEF DESCRIPTION OF THE DRAWINGS

The following will be apparent from elements of the figures, which are provided for illustrative purposes and are not necessarily to scale.

Figure 1:
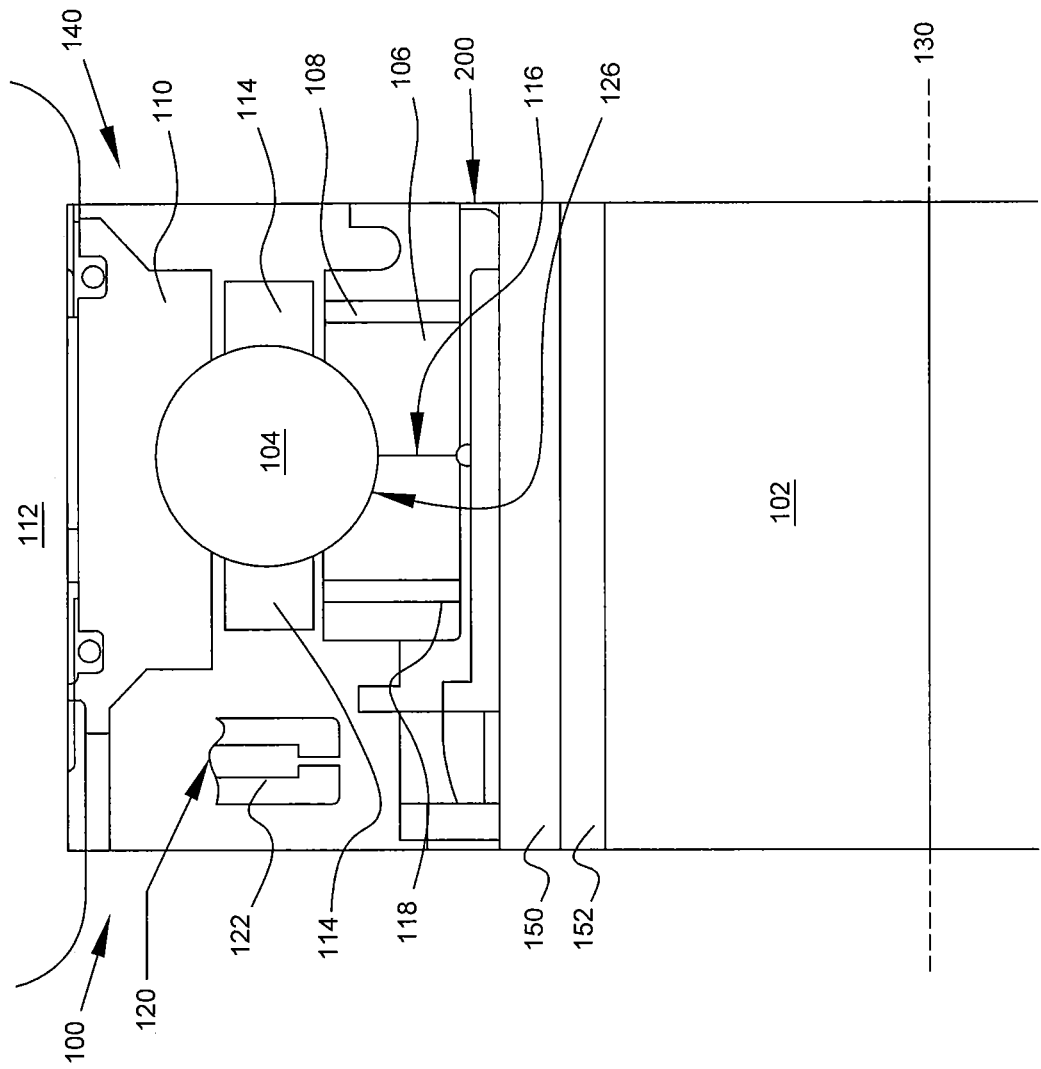
FIG. 1 is a side cutaway view of a rotor shaft bearing configuration having a circumferential lubricant scoop in accordance with some embodiments of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

The present disclosure is directed to various embodiments of a circumferential lubricant scoop which overcomes the deficiencies noted above. Specifically, the disclosed circumferential lubricant scoop has a lower head height, more compact axial length, and a reservoir which aides in moving lubricant through the capture region and toward distribution points in a bearing. Although the present disclosure presents embodiments of a lubricant scoop for use with a rolling element bearing assembly, it would be evident to one of skill in the art that the same or similar lubricant scoop could be used for similar systems requiring the rotating capture and distribution of lubricant, including other styles of bearing assemblies, seal runners, mechanical gears, splines, and the like.

FIG. 1 is a side cutaway view of a rotor shaft bearing configuration 100 having a circumferential lubricant scoop 200 in accordance with some embodiments of the present invention. The rotor shaft bearing configuration 100 comprises a rotor shaft 102, circumferential lubricant scoop 200, and a rolling element thrust bearing assembly 140. Shaft 102 has a centerline 130.

Circumferential lubricant scoop 200 is disposed about the radially outward circumference of rotor shaft 102. In some embodiments circumferential lubricant scoop 200 is interference fit to rotor shaft 102. In some embodiments, circumferential lubricant scoop 200 is coupled to rotor shaft 102 using other methods. Circumferential lubricant scoop 200, which is described in greater detail with reference to FIGS. 2, 3A, 3B, 4, and 5 below, comprises a plurality of vanes 202 and lubricant pathways for capturing and providing lubricant to rolling element thrust bearing assembly 140. Vanes 202 for capturing lubricant are disposed radially inward from a lubricant nozzle 122.

Lubricant nozzle 122 receives lubricant from a lubricant supply 120. In some embodiments, lubricant nozzle 122 sprays lubricant normal to centerline 130. In some embodiments, lubricant nozzle 122 sprays lubricant at an angle relative to centerline 130. In some embodiments, lubricant nozzle 122 sprays lubricant in a conical pattern. In embodiments having lubricant nozzle 122 spraying at an angle relative to centerline 130, an angle is selected for spraying which minimizes scoop shear across the oil spray and maximizes penetration into cavity 220. Further, in such embodiments nozzle 122 is configured to spray lubricant into the region between the vane 202 and body 214 of lubricant scoop 200.

Rolling element thrust bearing assembly 140 extends circumferentially about the rotor shaft 102 or about circumferential lubricant scoop 200. Rolling element thrust bearing assembly 140 translates loads from the rotor shaft 102 to static structures of the turbine engine such as mount 112. Rolling element thrust bearing assembly 140 comprises rolling element 104, inner race 106, outer race 110, and separator 114. Rolling element 104 is axially and radially retained between inner race 106 and outer race 110. Rolling element 104 is circumferentially retained within the separator 114. Outer race 110 is coupled to mount 112. In some embodiments rolling element 104 is a plurality of ball bearings. As rotor shaft 102 rotates during turbine engine operation, circumferential lubricant scoop 200 and inner race 106 are rotated.

Inner race 106 has a radially-outward facing receiver surface 126 which is configured to receive rolling element 104. In some embodiments, receiver surface 126 is a concave shape. Inner race 106 also has a plurality of pathways passing therethrough such that fluid communication is permitted between circumferential lubricant scoop 200 and the radially outward surface of inner race 106. For example, as illustrated in FIG. 1, inner race 106 has a forward fluid pathway 118, central fluid pathway 116, and aft fluid pathway 108.

FIG. 1 further illustrates the construction of rotor shaft 102 to which circumferential lubricant scoop 200 is coupled. In some embodiments, rotor shaft 102 is formed from a hollow member 150. In some embodiments, a second rotor shaft 152 is disposed within the hollow member 150 of first rotor shaft 102.

Figure 2:
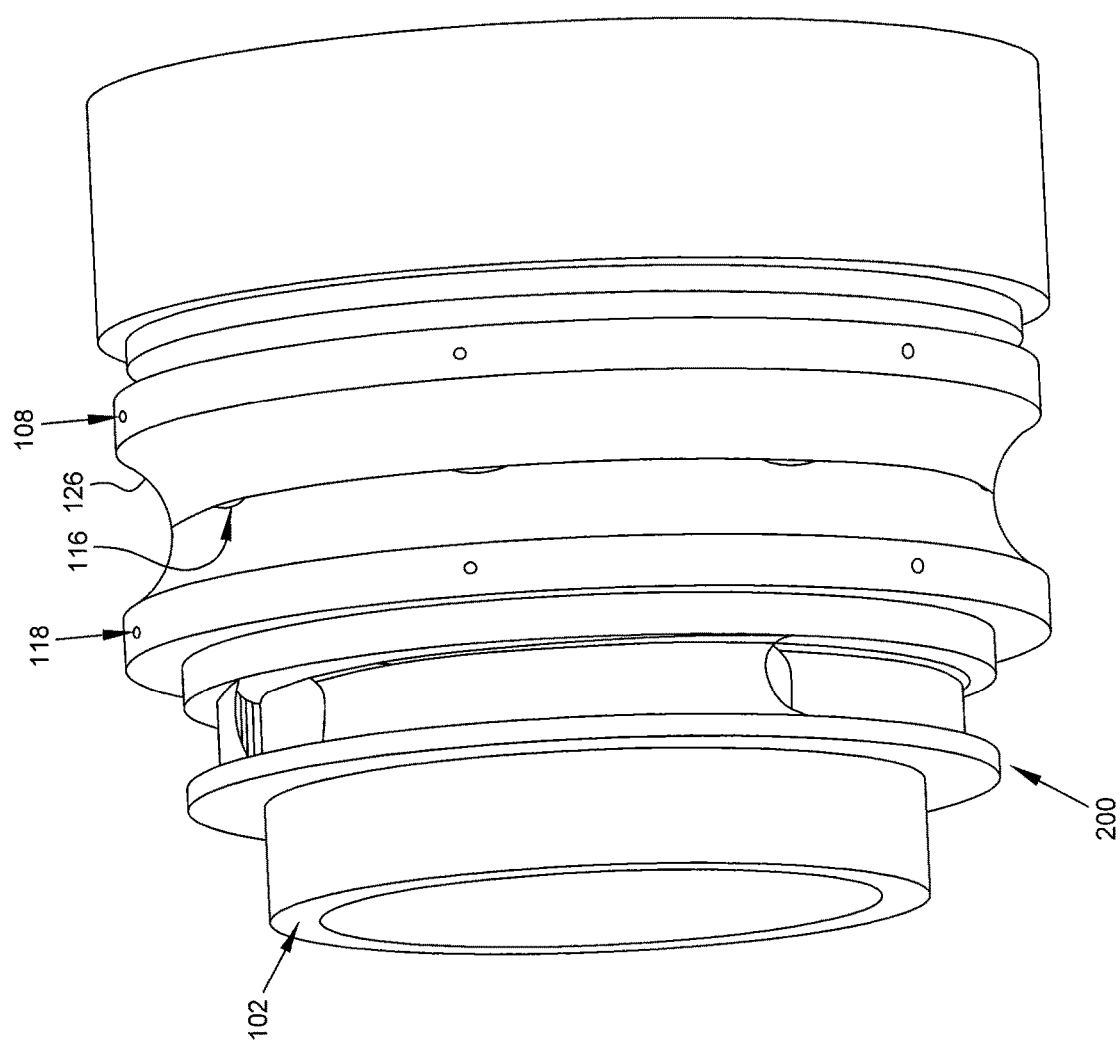
FIG. 2 is an isometric view of a rotor shaft, circumferential lubricant scoop, and inner race in an assembled configuration in accordance with some embodiments of the present disclosure.

FIG. 2 is an isometric view of rotor shaft 102, circumferential lubricant scoop 200, and inner race 106 in an assembled configuration in accordance with some embodiments of the present disclosure. As illustrated in FIG. 2, when assembled the circumferential lubricant scoop 200 is disposed in part axially forward of inner race 106, and disposed in part radially inward from inner race 106. Forward fluid pathway 118, central fluid pathway 116, and aft fluid pathway 108 are illustrated. Fluid pathways 118, 116, 108 can be intermittent or continuous. In the illustrated embodiments, fluid pathways 118, 116, and 108 are discrete holes disposed at regular intervals about the circumference of inner race 106. In some embodiments fluid pathways are referred to as fluid channels.

Figure 3A:
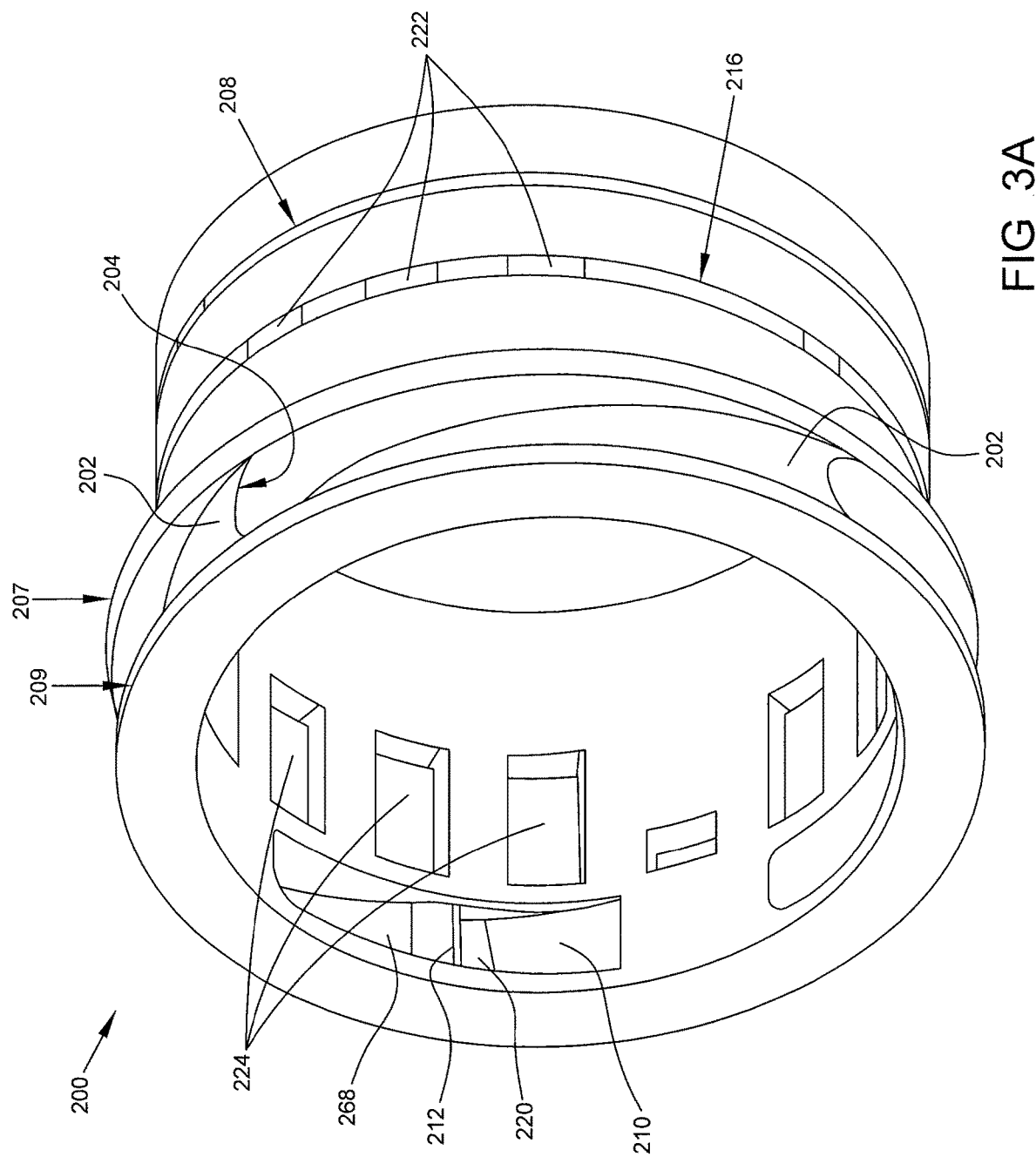
FIG. 3A is an isometric view of a circumferential lubricant scoop in accordance with some embodiments of the present disclosure.
Figure 3B:
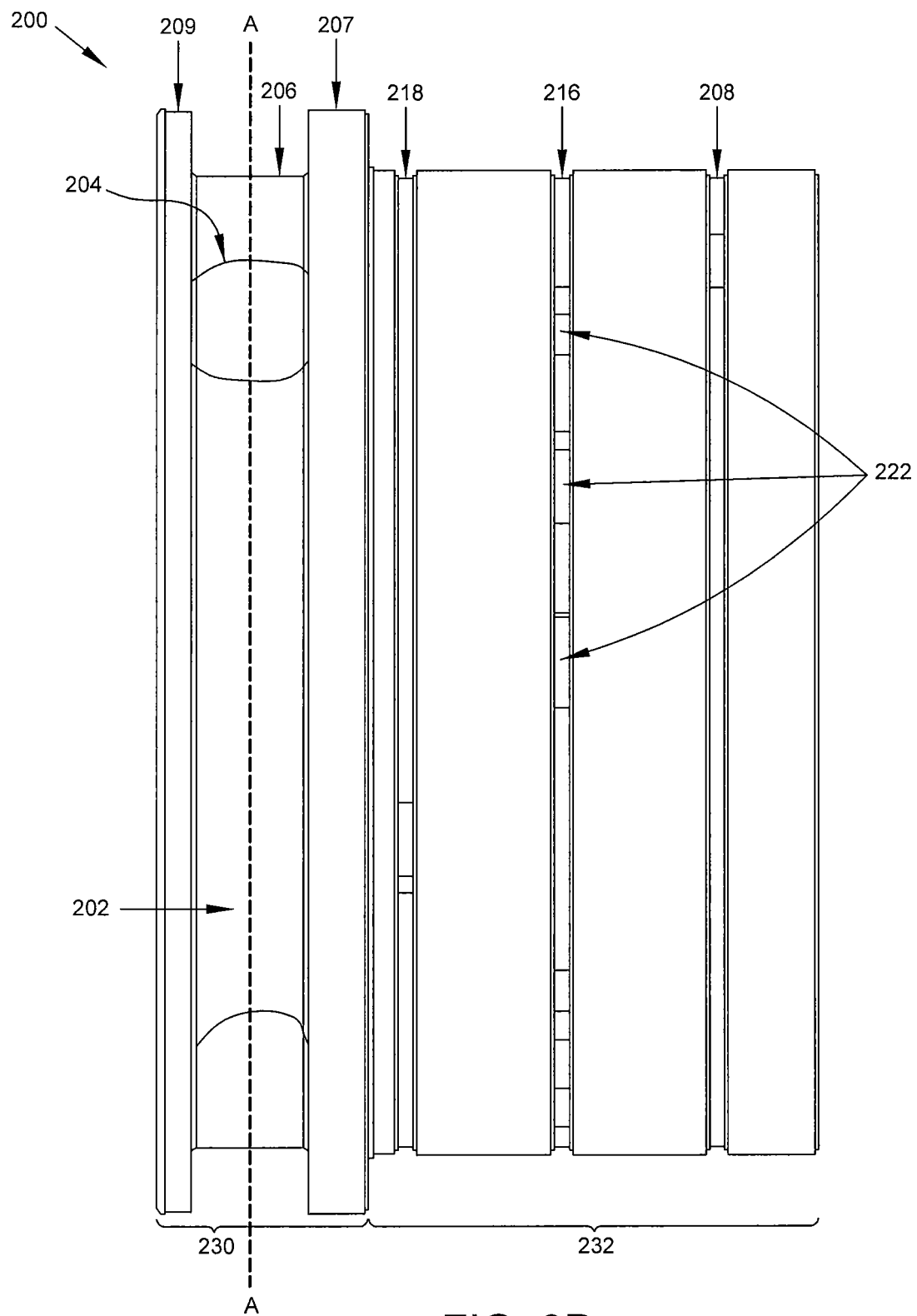
FIG. 3B is a side profile view of a circumferential lubricant scoop in accordance with some embodiments of the present disclosure.

FIG. 3A is an isometric view of a circumferential lubricant scoop in accordance with some embodiments of the present disclosure. FIG. 3B is a side profile view of a circumferential lubricant scoop in accordance with some embodiments of the present disclosure.

Circumferential lubricant scoop 200 comprises an axially forward portion 230 of a first outer diameter and an axially aft portion 232 of a second outer diameter. As shown in FIG. 3B, first outer diameter is larger than second outer diameter as the axially aft portion 232 is sized to be disposed between rotor shaft 102 and inner race 106, while axially forward portion 230 is sized to extend radially outward from rotor shaft 102 in order to capture lubricant from a lubricant reservoir or lubricant spray. In some embodiments portion 230 and portion 232 have an equal inner diameter, which is sized to be interference fit to a rotor shaft 102.

Axially forward portion 230 comprises a pair of raised annular portions 207, 209 which extend continuously about the circumference of lubricant scoop 200 and have a plurality of vanes 202 extending between them. The structure of each vane 202 is described in greater detail with reference to FIGS. 4A and 4B below. Each vane 202 partially defines a cavity 220 where captured lubricant accumulates. Cavity 220 is in fluid communication with a continuous annular channel (not shown in FIGS. 3A and 3B) which is in turn in fluid communication with axially extending fluid pathways 224.

Each of the axially extending fluid pathways 224 terminates at one of a plurality of annular distribution channels. FIGS. 3A and 3B illustrate three such channels, although in some embodiments greater or fewer channels are envisioned. In the illustrated embodiment, axially aft portion 232 includes a forward distribution channel 218, central distribution channel 216, and aft distribution channel 208. Each of these distribution channels are configured to axially align with a fluid pathway which passes through inner race 106. For example, forward distribution channel 218 is configured to axially align with forward fluid pathway 118, central distribution channel 216 is configured to axially align central fluid pathway 116, and aft distribution channel 208 is configured to axially align aft fluid pathway 108. Each of the distribution channels 208, 216, 218 have at least one distribution slot 222 which permits the passage of lubricant from an axially extending fluid pathway 224 into distribution channels 208, 216, 218. In some embodiments, distribution slots 222 are sized, spaced, and numbered in a distribution channel to achieve a desired flow rate of lubricant through that distribution channel.

Figure 4A:
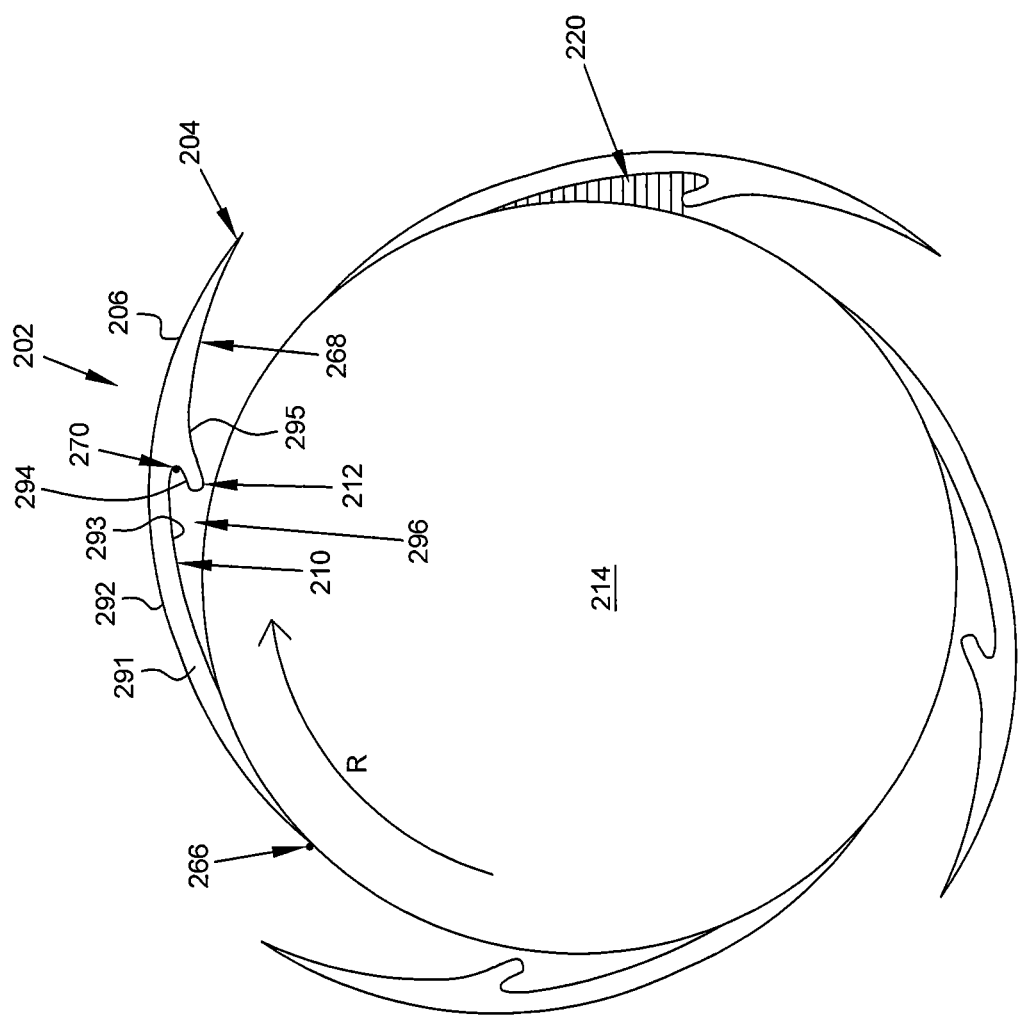
FIG. 4A is a profile view of a plurality of vanes of a circumferential lubricant scoop in accordance with some embodiments of the present disclosure.

FIG. 4A is a cutaway view of a plurality of vanes 202 of a circumferential lubricant scoop as viewed normal to axis A illustrated in FIG. 3B, in accordance with some embodiments of the present disclosure. Each of the plurality of vanes 202 comprise a leading edge 204, a lower lip 212, a first capture surface 268 extending between leading edge 204 and lower lip 212, a second capture surface 210 extending between lower lip 212 and body 214, and a radially outward surface 206 extending between leading edge 204 and body 214. An intermediate trailing edge 270 is defined as the junction between second capture surface 210 and lower lip 212. A trailing edge 266 is defined as the junction between radially outward surface 206 and body 214.

A cavity 220 is defined between second capture surface 210, lower lip 212, and body 214 and is illustrated in FIG. 4A as a lined region. Cavity 220 is in fluid communication with a continuous annular channel (not shown in FIG. 4A).

Figure 4B:
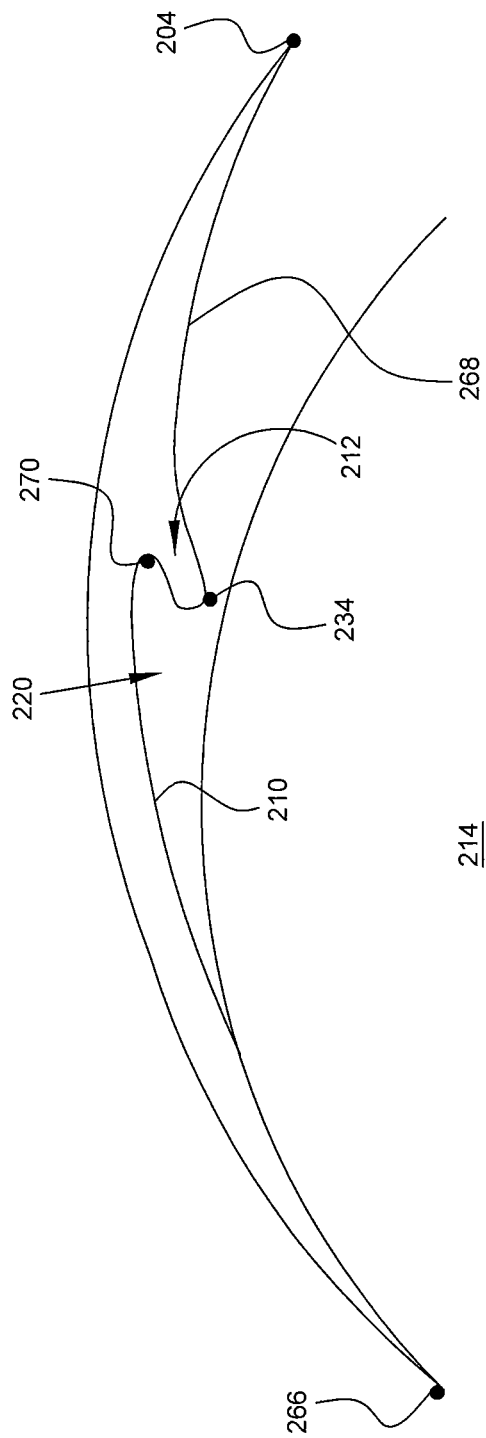
FIG. 4B is an enlarged profile view of a vane of a circumferential lubricant scoop in accordance with some embodiments of the present disclosure.
Figure 6A:
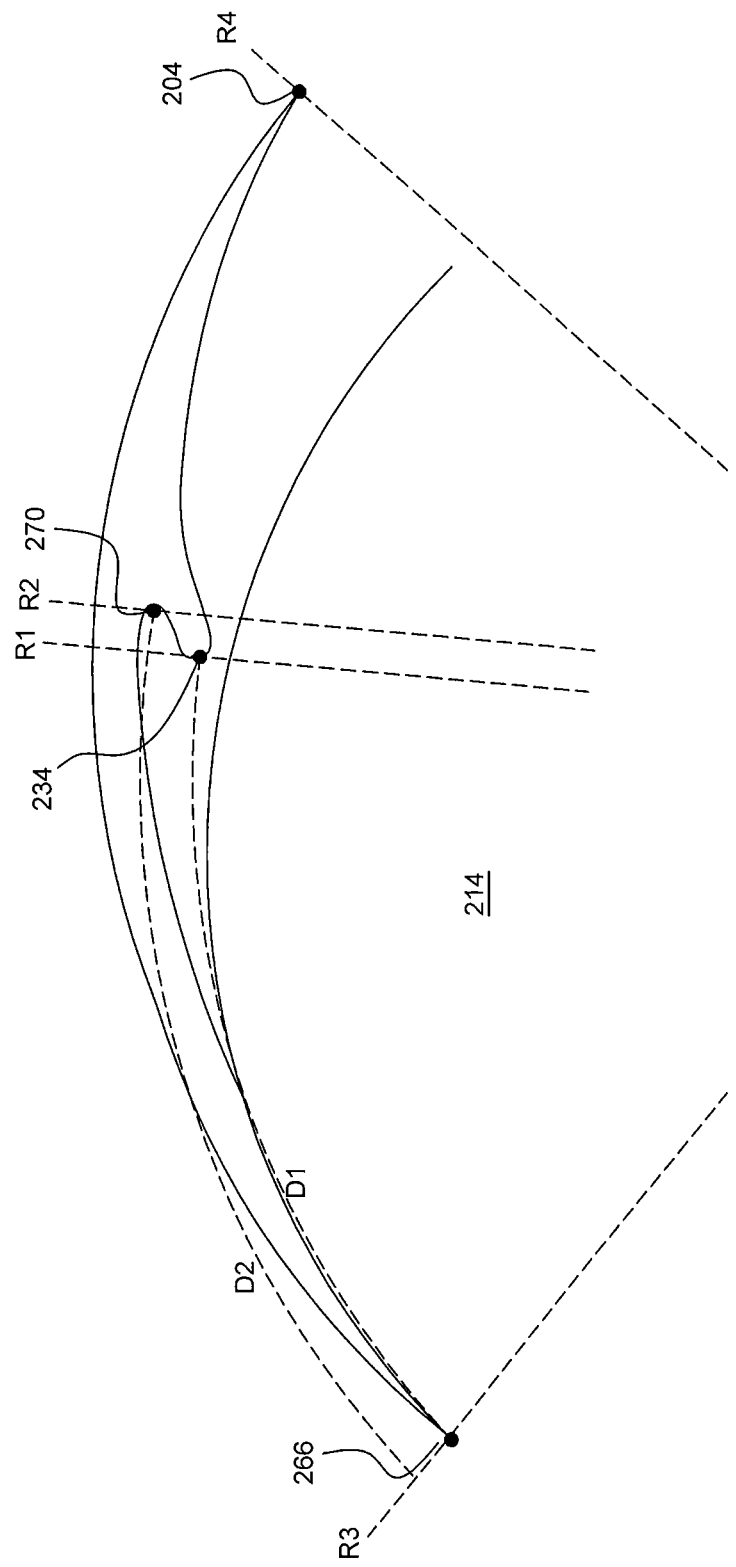
FIG. 6A is an enlarged profile view of a vane of a circumferential lubricant scoop in accordance with some embodiments of the present disclosure.

FIGS. 4B and 6A provide enlarged profile views of a vane 202 of a circumferential lubricant scoop in accordance with some embodiments of the present disclosure. As best shown in these figures, lower lip 212 terminates at a tip 234 which is disposed circumferentially closer to trailing edge 266 than intermediate trailing edge 270. With reference to FIG. 6A, it can be seen that tip 212 is disposed at a first circumferential position which is indicated by radius R1 and intermediate trailing edge 270 is at a second circumferential position which is indicated by radius R2. Trailing edge 266 is at a third circumferential position which is indicated by radius R3, and leading edge 204 is at a fourth circumferential position which is indicated by radius R4. A first circumferential distance D1 is defined between radius R1 and radius R3, while a second circumferential distance D2 is defined between radius R2 and radius R3. In some embodiments, as shown in FIG. 6A, the sawtooth shape of vane 202 has a second circumferential distance D2 which is greater than the first circumferential distance D1.

In other words, lower lip 212 creates a sawtooth shape separating first capture surface 268 and second capture surface 210, as intermediate trailing edge 270 cuts back in the direction of leading edge 204. This sawtooth shape allows for an expanded volume of cavity 220 as compared to typical designs in the prior art, which aides in preventing impingement of incoming lubricant and allows for a larger flow capacity than typical designs. Similarly, the larger volume of cavity 220 would allow for a reducing the circumference of the circumferential lubricant scoop 200 to help meet space demands in the turbine engine.

FIG. 4B additionally illustrated the various radial distances used in the geometry of a vane 202 in accordance with some embodiments of the present disclosure. As shown in the sawtooth shape of FIG. 4B, intermediate trailing edge 270 is disposed at a radial distance from centerline 130 which is equal to or substantially equal to the radial distance from centerline 130 for the leading edge 204.

Figure 6B:
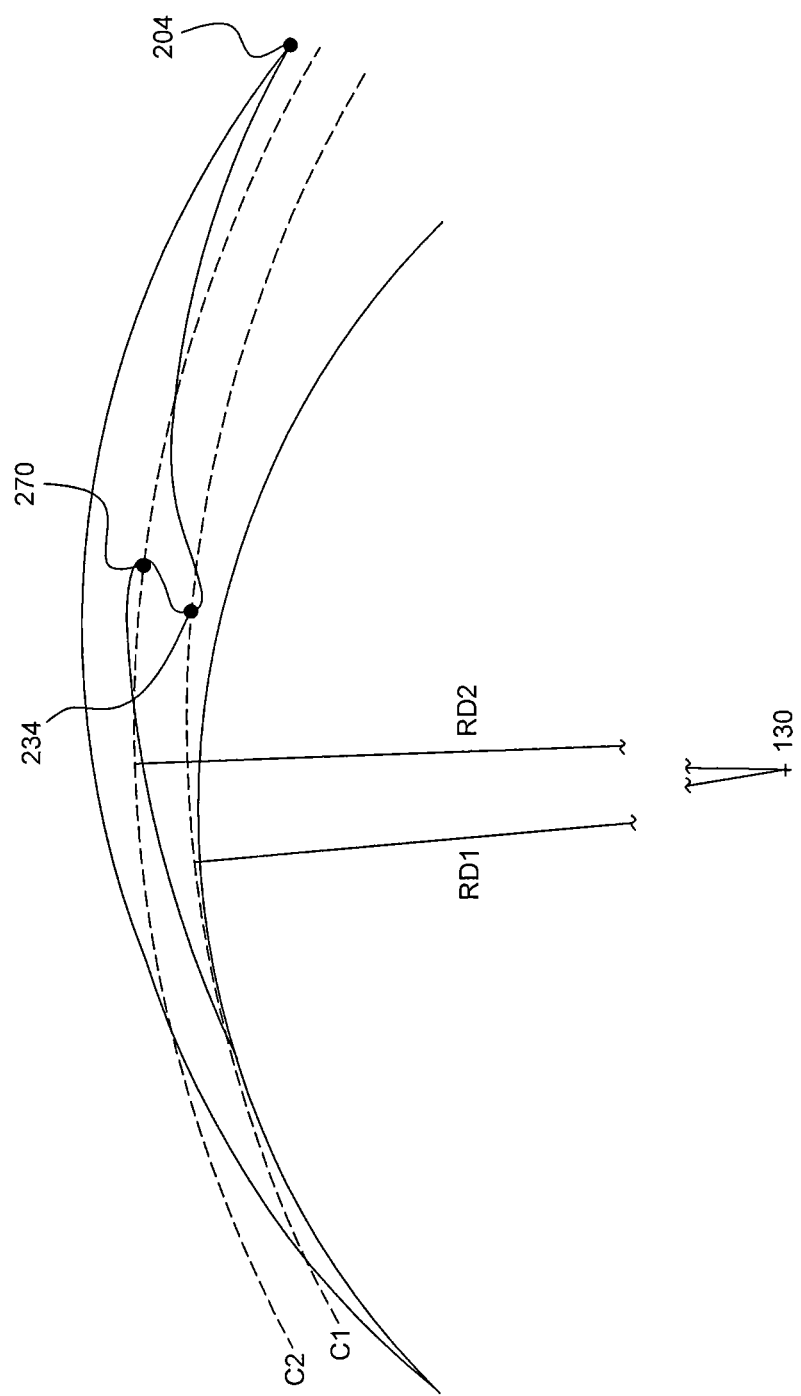
FIG. 6B is an enlarged profile view of a vane of a circumferential lubricant scoop in accordance with some embodiments of the present disclosure.

However, in other embodiments such as that illustrated in FIG. 6B the intermediate trailing edge 270 is disposed at a radial distance from centerline 130 which is greater than the radial distance from centerline 130 for the leading edge 204. As shown in FIG. 6B a first circumference C1 is illustrated by a dotted line at a first radial distance RD1 from centerline 130 (which is not illustrated due to the enlarged scale of FIG. 6B). A second circumference C2 is illustrated by a dotted line at a second radial distance RD2 from centerline 130. Second radial distance RD2 is greater than first radial distance. In some embodiments, intermediate trailing edge 270 is disposed along the second circumference C2 while tip 234 is disposed along the first circumference C1. Thus, in some embodiments intermediate trailing edge 270 is located at a greater radial distance from centerline 130 than tip 234.

Using a greater radial distance at intermediate trailing edge 270 creates a sawtooth pattern which expands the volume of cavity 220, which aides in preventing impingement of incoming lubricant and allows for a larger flow capacity than typical designs. Similarly, the larger volume of cavity 220 would allow for a reducing the circumference of the circumferential lubricant scoop 200 to help meet space demands in the turbine engine.

The vane 210 may comprise a tail 290 having a tail outer surface 291 and tail inner surface 292. The lip 212 of the vane 210 may comprise a lip inner surface 295 and a lip outer surface 294. The area between the vane 210 and the body 214 may comprise an annular reservoir 296.

Figure 5:
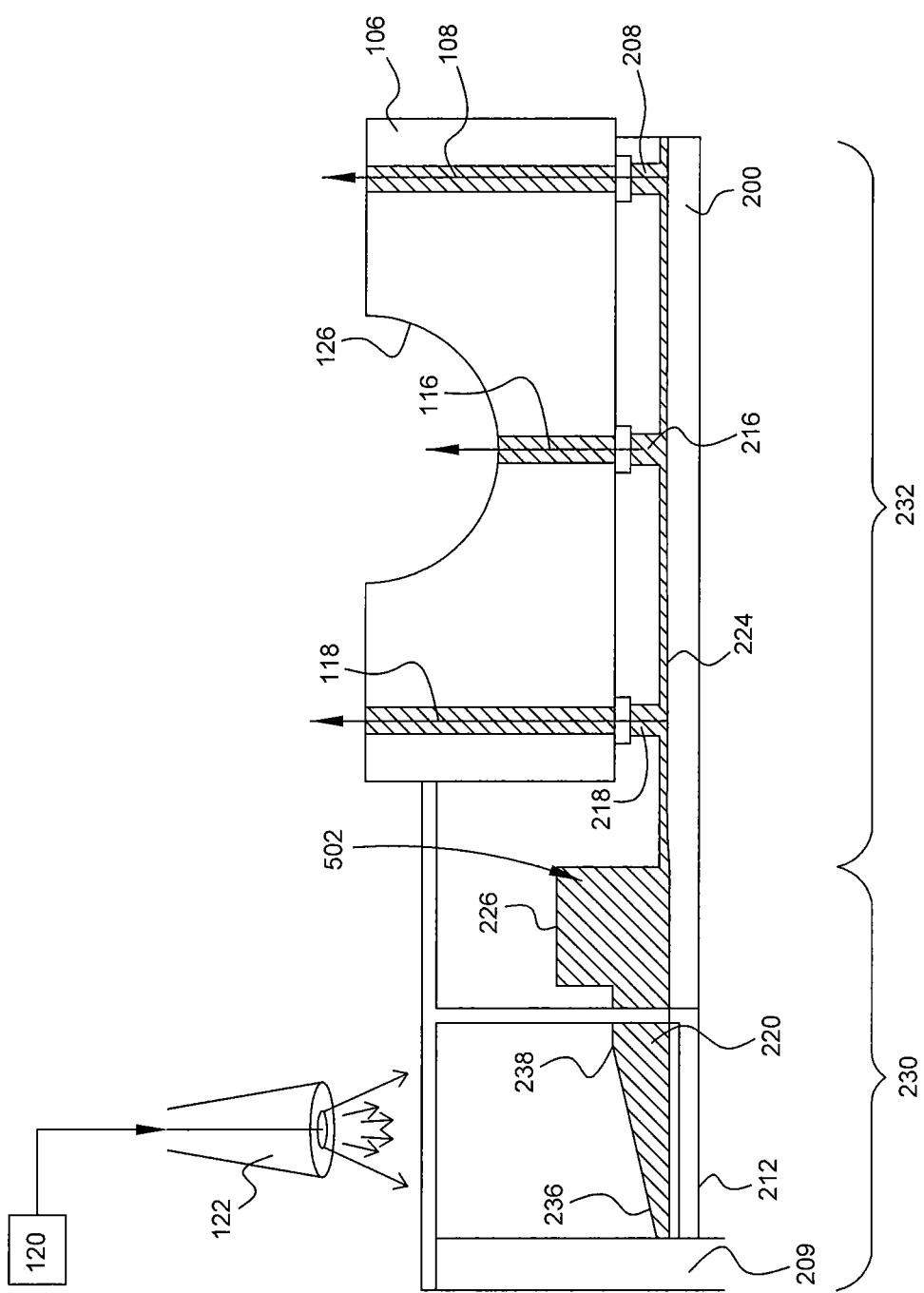
FIG. 5 is a cutaway view of a circumferential lubricant scoop and inner race in accordance with some embodiments of the present disclosure.

FIG. 5 is a cutaway view of a circumferential lubricant scoop 200 and inner race 106 in accordance with some embodiments of the present disclosure. FIG. 5 best illustrates the internal fluid pathways 224 which communicated lubricant from cavity 220 to distribution channels 218, 216, and 208. Lubricant is illustrated as shaded area 502. In some embodiments, lubricant supply 120 supplies lubricant to nozzle 122, which sprays lubricant in the vicinity of and/or in the direction of axially forward portion 230. Lubricant is captured by the lower lip 212 of a vane 202 and is retained in cavity 220. Cavity 220 is defined in the radially outward direction by second capture surface 210, which is angled axially fore to aft such that the axially forward portion 236 of second capture surface 210 is radially inward when compared to the axially aft portion 238 of second capture surface 210.

Cavity 220 is in fluid communication with a continuous annular channel 226 which is interior to raised annular portion 207. Lubricant captured by lower lip 212 enters cavity 220 and is pushed against the angled second capture surface 210 by rotational force, thus entering channel 226. Once channel 226 is filled with lubricant, the lubricant will overflow the channel 226 and enter a plurality of axially extending fluid pathways 224 which communicate the lubricant to distribution channels 218, 216, and 208. As discussed above distribution channels 218, 216, and 208 are aligned with fluid pathways 118, 116, and 108 in inner race 106.

Due to the geometric complexity and compact configuration, manufacturing the circumferential lubricant scoop described herein may require precision casting, additive layer manufacturing, or other non-traditional manufacturing techniques. Finish machining of key interfacing surfaces is critical no matter what manufacturing techniques are used, and surface finish treatments may also need to be evaluated.

The disclosed circumferential lubricant scoop 200 provides numerous advantages over the prior art. First, the disclosed scoop minimizes the space required to capture and communicate lubricant to a bearing assembly. In particular, the scoop is effective for use with smaller diameter shafts than scoops disclosed in the prior art. The scoop is also axially and radially more compact.

Since the scoop uses centrifugal force to move lubricant through the scoop, reliance on lubricant relative inertia is minimized. Further, the disclosed continuous annular channel provides a reservoir of lubricant for ensuring the continuous flow and even distribution of lubricant to all distribution channels throughout rotation of the scoop.

Another advantage comes from the configuration of lower lip and intermediate trailing edge. By placing the tip of lower lip circumferentially closer to trailing edge, and intermediate trailing edge circumferentially closer to leading edge, this sawtooth pattern defines a cavity which improves capture of lubricant by the vane. Thus the risk of oil leakage from the cavity is reduced, as is the likelihood that new lubricant would be impinged.

Finally, the quantity of distribution slots can be optimized in each distribution channel to provide a desired flow rate of lubricant into that distribution channel and thus into the associated pathway of the inner race. Thus in the illustrated embodiment it is possible to select and achieve three separate flow rates, with a different flow rate in each of distribution channels 218, 216, and 208.

The present application discloses one or more of the features recited in the appended claims and/or the following features which, alone or in any combination, may comprise patentable subject matter.

According to an aspect of the present disclosure, a lubricant scoop in a gas turbine engine having a rotor shaft and a bearing assembly comprises a plurality of vanes configured to rotate with and extending tangentially from said rotor shaft in a circumferential row, each of said plurality of vanes defining a lubricant capture region between a radially-inward surface of the vane and the rotor shaft; fluid pathways in fluid communication with the lubricant capture region for providing lubricant from the lubricant capture region to the bearing assembly; and wherein each of said plurality of vanes has a protruding lower lip extending radially inward at an intermediate portion of the vane such that a cavity is partially defined by the lower lip, said cavity in fluid communication with the fluid pathways and configured to provide improved lubricant flow through the fluid pathways. In some embodiments the lower lip separates a first capture surface from a second capture surface, wherein an intermediate trailing edge is defined at the juncture between said lower lip and said second capture surface, wherein a trailing edge is defined at the juncture between said second capture surface and a body, and wherein said lower lip terminates at a tip which is disposed circumferentially closer to the trailing edge of the vane than the intermediate trailing edge. In some embodiments the lower lip separates a first capture surface from a second capture surface, wherein an intermediate trailing edge is defined at the juncture between said lower lip and said second capture surface, wherein a trailing edge is defined at the juncture between said second capture surface and a body, wherein said intermediate trailing edge is disposed at a first radial distance from a centerline of the rotor shaft, wherein said leading edge is disposed at a second radial distance from the centerline, and wherein said first radial distance is greater than said second radial distance. In some embodiments the lubricant scoop further comprises a continuous annular channel disposed between and in fluid communication with the cavity and the fluid pathways for ensuring continuous lubricant flow, wherein said fluid pathways provide lubricant to an inner race of the bearing assembly, said inner race having at least one fluid channel therethrough for providing lubricant to a roller bearing element, and wherein said fluid pathways terminate in a plurality of fluid distribution slots which are axially aligned with the at least one fluid channel through the inner race.

According to another aspect of the present disclosure, a circumferential lubricant scoop comprises a plurality of vanes arranged around an axis, each of the plurality of vanes having a leading edge, a trailing edge, an intermediate trailing edge, a tail, and a lower lip; the tail having an upper surface extending from a trailing edge at a first inter radius and first circumferential position to the leading edge at a second outer radius and second circumferential position and a tail lower surface extending from the trailing edge to a lip upper surface at a third radius greater than the radius of the intermediate trailing edge; the lower lip having a lower surface extending radially inward from the leading edge to the intermediate trailing edge, the intermediate trailing edge between the respective first and second circumferential positions and between the first inter radius and the second outer radius, and the lip upper surface extending from the intermediate trailing edge to the tail lower surface; wherein the tail lower surface and the lip upper surface define a cavity extending radially outward from the axis; an annular reservoir in fluid communication with the cavity of each of the plurality of vanes; one or more channels in fluid communication with and extending axially from the annular reservoir; a plurality of distribution slots, each in fluid communication with a respective one of the one or more channels and in fluid communication with a bearing.

In some embodiments the tail lower surface proximate the annular reservoir is oblique to the axis. In some embodiments the annular reservoir extends radially outwards more than the cavity. In some embodiments the tail lower surface is curved. In some embodiments the lower surface of the lip is curved. In some embodiments the upper surface of lip intersects the tail lower surface at an acute angle. In some embodiments the plurality distribution slots are distributed axially along the bearing. In some embodiments the one or more channels are parallel with one another. In some embodiments the plurality of distribution slots are distributed circumferentially. In some embodiments the plurality of distribution slots distributed circumferentially are in fluid communication with a annular groove. In some embodiments the annular reservoir, one or more channels and slots are within a sleeve. In some embodiments the sleeve is adapted to receive a shaft.

According to an aspect of the present disclosure, a method of providing lubrication to an axial bearing in a turbine engine comprises supplying oil by a stationary oil jet; capturing the oil in an oil scoop affixed to a shaft rotating about an axis, said oil scoop including a bottom lip, carrying the oil past the bottom lip utilizing the inertia of the captured oil; accelerating the oil that has past the bottom lip and slinging the oil into a chamber inside the scoop above the bottom lip; forcing the oil in the cavity to an annular dam in fluid communication with the chamber; wherein the chamber is radially displace outward from the bottom lip. In some embodiments the method further comprises distributing the oil in the annular dam to the axial bearing through a plurality of channels and respective slots, wherein the slots are distributed axial across the bearing. In some embodiments the distribution of the oil is a function of the number and length of each of the channel and the head pressure of the oil in the chamber. In some embodiments the maximum head pressure is a function of the chamber position and rotation of the oil scoop.

Although examples are illustrated and described herein, embodiments are nevertheless not limited to the details shown, since various modifications and structural changes may be made therein by those of ordinary skill within the scope and range of equivalents of the claims.

What is claimed is:

1. A lubricant scoop in a gas turbine engine having a rotor shaft and a bearing assembly, said lubricant scoop comprising:
    a plurality of vanes configured to rotate with and extending tangentially from said rotor shaft in a circumferential row, each of said plurality of vanes defining a lubricant capture region between a radially-inward surface of the vane and the rotor shaft;
    fluid pathways in fluid communication with the lubricant capture region for providing lubricant from the lubricant capture region to the bearing assembly; and
    wherein each of said plurality of vanes has a protruding lower lip extending radially inward at an intermediate portion of the vane such that a cavity is partially defined by the lower lip, said cavity in fluid communication with the fluid pathways and configured to provide improved lubricant flow through the fluid pathways;
    wherein said lower lip separates a first capture surface from a second capture surface, wherein an intermediate trailing edge is defined at the juncture between said lower lip and said second capture surface, wherein a trailing edge is defined at the juncture between said second capture surface and a body, and wherein said lower lip terminates at a tip which is disposed at a circumferential distance from the trailing edge that is less than a circumferential distance between the intermediate trailing edge and the trailing edge.

2. The lubricant scoop of claim 1 wherein said lower lip separates a first capture surface from a second capture surface, wherein an intermediate trailing edge is defined at the juncture between said lower lip and said second capture surface, wherein a trailing edge is defined at the juncture between said second capture surface and a body, wherein said intermediate trailing edge is disposed at a first radial distance from a centerline of the rotor shaft, wherein a leading edge is disposed at a second radial distance from the centerline, and wherein said first radial distance is less than said second radial distance.

3. The lubricant scoop of claim 2 further comprising a continuous annular channel disposed between and in fluid communication with the cavity and the fluid pathways for ensuring continuous lubricant flow, wherein said fluid pathways provide lubricant to an inner race of the bearing assembly, said inner race having at least one fluid channel therethrough for providing lubricant to a roller bearing element, and wherein said fluid pathways terminate in a plurality of fluid distribution slots which are axially aligned with the at least one fluid channel through the inner race.

4. A circumferential lubricant scoop comprising:
a plurality of vanes arranged around an axis,
each of the plurality of vanes having a leading edge, a trailing edge, an intermediate trailing edge, a tail, and a lower lip;
the tail having an outer surface extending from a trailing edge at a first inter radius and first circumferential position to the leading edge at a second outer radius and second circumferential position and a tail inner surface extending from the trailing edge to a lip outer surface at a third radius greater than the radius of the intermediate trailing edge;
the inner lip having an inner surface extending radially inward from the leading edge toward the intermediate trailing edge, the intermediate trailing edge between the respective first and second circumferential positions and between the first inter radius and the second outer radius, and the lip outer surface extending from the intermediate trailing edge to the tail inner surface;
wherein the tail inner surface and the lip outer surface define a cavity extending radially outward from the axis;
wherein the lip inner surface terminates at a tip which is disposed at a circumferential distance from the trailing edge that is less than a circumferential distance between the intermediate trailing edge and the trailing edge;
an annular reservoir in fluid communication with the cavity of each of the plurality of vanes;
one or more channels in fluid communication with and extending axially from the annular reservoir;
a plurality of distribution slots, each in fluid communication with a respective one of the one or more channels and in fluid communication with a bearing.

5. The circumferential lubricant scoop of claim 4, wherein the tail inner surface proximate the annular reservoir is oblique to the axis.

6. The circumferential lubricant scoop of claim 4, wherein the annular reservoir extends radially outwards more than the cavity.

7. The circumferential lubricant scoop of claim 4, wherein the tail inner surface is curved.

8. The circumferential lubricant scoop of claim 4, wherein the inner surface of the lip is curved.

9. The circumferential lubricant scoop of claim 4, wherein the outer surface of the lip intersects the tail inner surface at an acute angle.

10. The circumferential lubricant scoop of claim 4 wherein the plurality distribution slots are distributed axially along the bearing.

11. The circumferential lubricant scoop of claim 4, wherein the one or more channels are parallel with one another.

12. The circumferential lubricant scoop of claim 4, wherein the plurality of distribution slots are distributed circumferentially.

13. The circumferential lubricant scoop of claim 12, wherein the plurality of distribution slots distributed circumferentially are in fluid communication with a annular groove.

14. The circumferential lubricant scoop of claim 4, wherein the annular reservoir, the one or more channels, and the distribution slots are disposed within a sleeve.

15. The circumferential lubricant scoop of claim 14, wherein the sleeve is adapted to receive a shaft.

* * * * *